Aug. 9, 1932.   W. L. WRIGHT   1,870,664
OPTICAL SYSTEM
Filed March 17, 1930   2 Sheets-Sheet 1
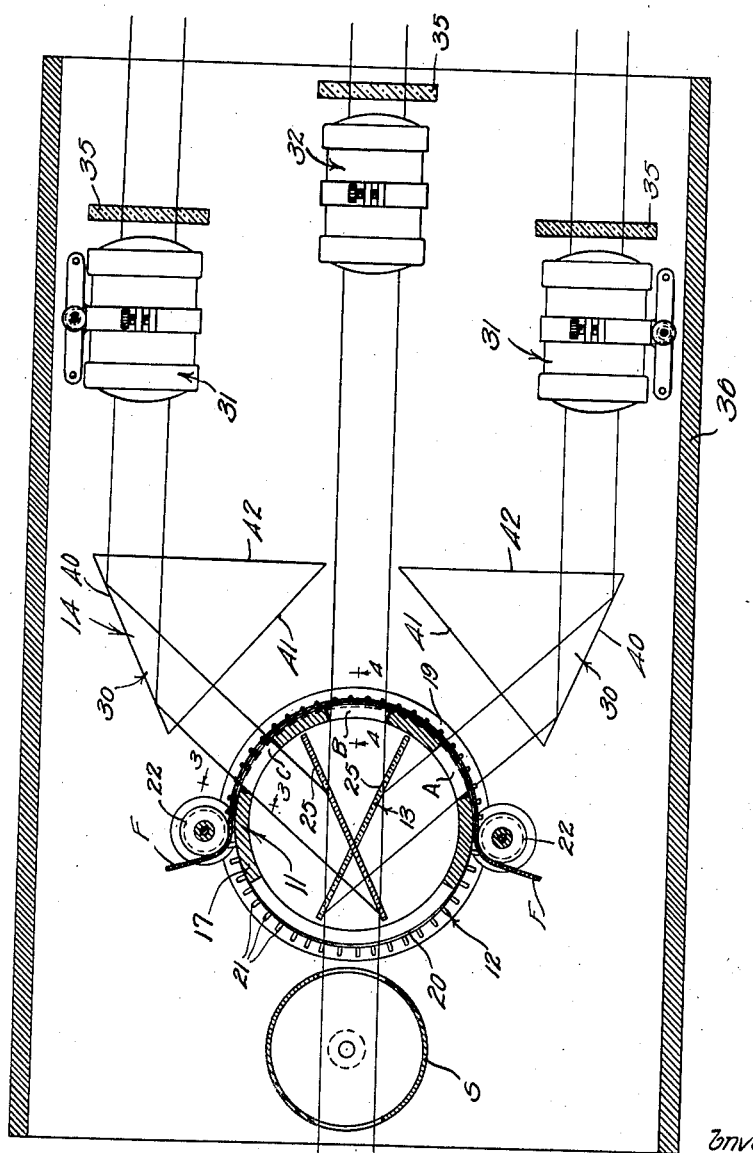
Fig.1.
Inventor
WALTER L. WRIGHT
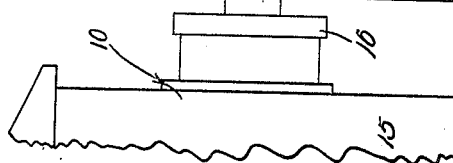
His Attorney

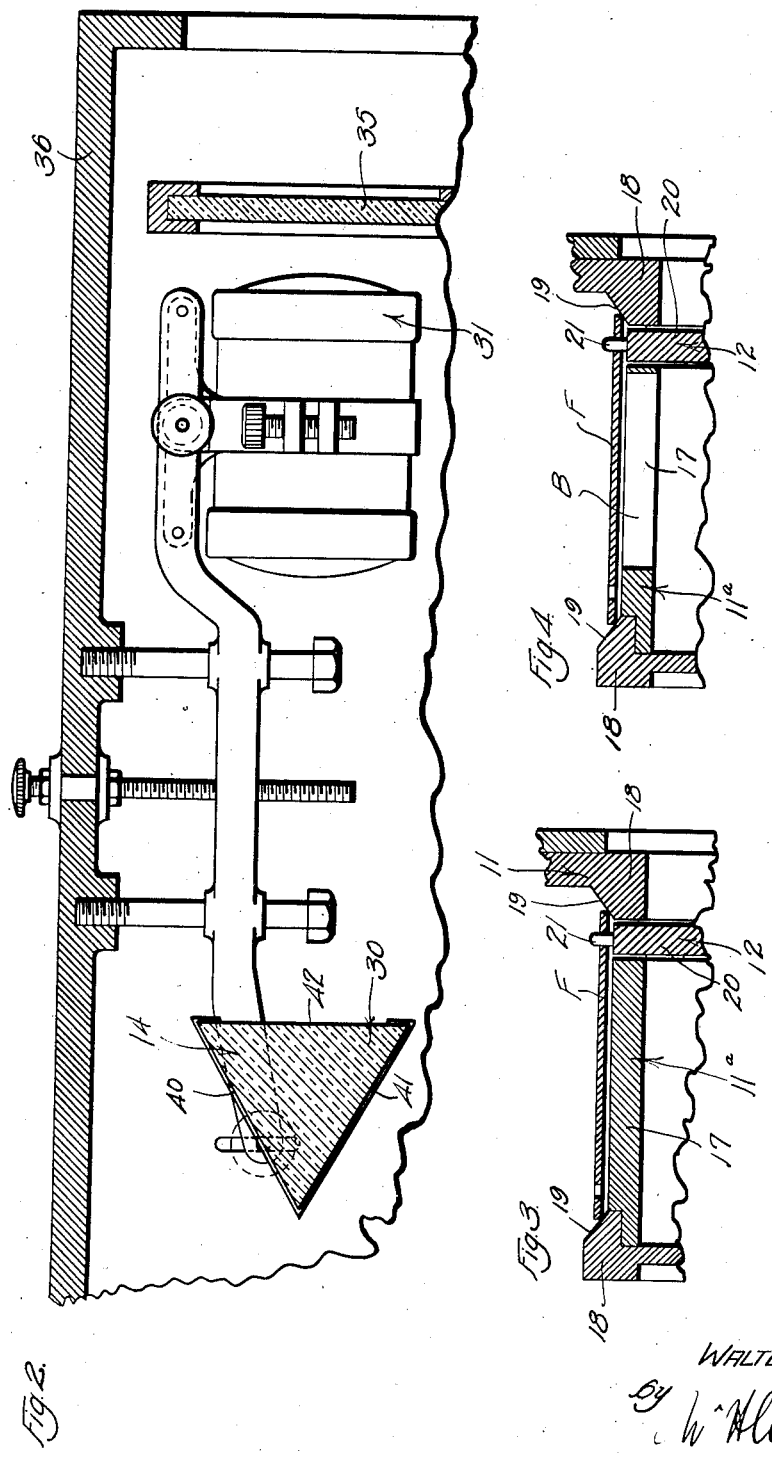

Patented Aug. 9, 1932

1,870,664

UNITED STATES PATENT OFFICE

WALTER L. WRIGHT, OF SANTA MONICA, CALIFORNIA, ASSIGNOR TO SYNCHROME CORPORATION, OF LOS ANGELES COUNTY, CALIFORNIA, A CORPORATION OF CALIFORNIA

OPTICAL SYSTEM

Application filed March 17, 1930. Serial No. 436,318.

This invention relates to an optical system and has particular reference to a system useful in motion picture projectors, it being an object of the invention to provide an optical system whereby a plurality of pictures carried on a film may be effectively and accurately projected onto a screen in register.

In accordance with one method of producing colored motion pictures a plurality of series of pictures are taken on a single film, the pictures of each series being spaced longitudinally of the film and being of different chromatic values of a subject taken simultaneously from a single point of vision. One particular form of this general arrangement, which form I will hereinafter refer to, provides three pictures in each series and provides spaces between adjoining pictures of each series so that adjoining series overlap or mesh together, occupying the entire available picture area of the film. With the optical systems and arrangements heretofore proposed and available for use difficulty has been experienced in effectively projecting film of the character mentioned.

It is an object of this invention to provide an optical system whereby the film carrying the series of pictures to be projected is held in a predetermined position while light from a suitable source is divided so that it is projected through the pictures and is then directed onto a screen so that the images are in register.

Another object of this invention is to provide an optical system of the character referred to in which a single source of light is effectively divided and directed through a plurality of separate pictures to be thereafter directed onto a screen so that the pictures are in register.

Another object of this invention is to provide an optical system of the character mentioned which is extremely simple and which eliminates or avoids undesirable distortion such as frequently occurs in optical systems of this general character.

It is a further object of this invention to provide an optical system of the character mentioned employing a projector lens for the shaft of light passing through each picture, which lenses are equally spaced from the film making possible accurate and effective projection of the several images onto a screen.

The various objects and features of my invention will be best and more fully understood from the following detailed description of a typical preferred form and application of the invention, throughout which description reference is had to the accompanying drawings, in which:

Fig. 1 is a more or less diagrammatic view illustrating the optical system provided by this invention, being a view illustrating the general combination and arrangement of parts entering into the invention. Fig. 2 is an enlarged detailed view of a portion of the optical system, being a view illustrating certain mechanical details which may be employed in carrying out the invention. Fig. 3 is an enlarged detail sectional view of a portion of the apparatus, being a view taken as indicated by line 3—3 on Fig. 1 and showing the manner in which the film is guided and engaged by the advancing member, and Fig. 4 is an enlarged detailed sectional view taken as indicated by line 4—4 on Fig. 1, being a view illustrating the manner in which the film is supported at an aperture through which a shaft of light is projected.

The optical system provided by the invention includes, generally, a source of light 10, means 11 supporting a length of film carrying a series of pictures to be projected and engaging the film to advance it, light dividing means 13 operating to receive light from the source 10 and direct it through the several pictures of the series on the film F, and means 14 receiving light after it has passed through the film and directing it onto a screen so that the several pictures are in register.

In the form of the invention illustrated I employ a single source of light. For instance, I may use an ordinary lamp 15 which directs a shaft of light through a suitable lens device 16. For the purpose of example the lamp 15 may be considered the usual form of lamp used in motion picture projectors and the lens device 16 may be a suitable condenser lens which operates to direct a suitable shaft of light onto the parts about to be described.

The means 11 that I have illustrated includes generally a film carrier 11ª and a film advancing member 12.

The film carrier 11 operates to hold a length of film F curved about a center. The particular form of carrier illustrated includes a plate 17 curved about the center and flanges 18 at the edges of the plate having opposed bevel faces 19 on which the edges of the film F bear. The parts just described are preferably designed and proportioned so that the film F operates over the plate 17 with a slight clearance. A plurality of apertures A, B, and C are formed in the plate 17 in suitable spaced relation, the aperture B being in direct alignment with the shaft of light projected by the source 10, and the apertures A and C being spaced in opposite directions around the plate from the aperture B. For purpose of the present description the aperture B may be referred to as the center aperture and the apertures A and C as the end apertures. It is to be understood, of course, that the apertures A, B, and C are spaced apart so that they register with the several pictures of a series of pictures on the film F. It is to be particularly noted that the plate 17 terminates a short distance beyond the end apertures A and C leaving a substantial opening between the two ends of the plate 17 opposite the aperture B through which the shaft of light from the source 10 enters.

The film advancing member 12 may, in accordance with the broader principles of the invention, be any suitable device or mechanism operable to intermittently advance the film with reference to the carrier in suitable timed relation to a shutter S. In the case illustrated the plate 17 is provided with a slot adjacent one of the flanges 18. The member 12 is in the nature of a sprocket 20 and extends into the slot and is provided with teeth 21 which engage the perforations adjacent the edge of the film. It will be obvious that any suitable movement mechanism may be provided for intermittently operating the sprocket so that it advances the film in the desired manner.

The shutter S is preferably of the barrel type and is arranged between the source of light 10 and the film carrier 11 as clearly shown in Fig. 1 of the drawings. By this arrangement the shutter effectively interrupts considerable heat that would otherwise reach the film or the light dividing means 13. Further, the shutter when in this position interrupts a single shaft of light. In practice guides or guide rollers 22 are provided immediately beyond the end apertures A and C to direct the film with reference to the carrier 11 and member 12 so that it is fed onto the carrier and leaves the carrier in proper mesh with the sprocket 20. The general type of film carrier 11 and film advancing member 17 just described are fully set forth and are claimed in my co-pending application entitled Film guide construction, filed Sept. 25, 1928, Serial No. 308,241.

The light dividing means 13 operates to divide the shaft of light coming from the source of light 10 to direct spaced shafts outward through the apertures A, B, and C so that the said shafts pass through the pictures on the film which are in register with the apertures. The means 13 is located within the film carrier 11, and in the form of the invention illustrated includes two transparent plates 25, one for directing the light through each end aperture. The plates may be crossed so that they join along a line parallel with the axis about which the film is curved and intersecting the shaft of light from the source 10. The transparent plates 25 are preferably flat and are angularly desposed so that each plate operates as a reflector to reflect off part of the shaft of light from the source 10 through one of the end apertures of the plate 17. The light which passes through the plates 25 continues through the center aperture B. The angle or inclination of the transparent plates 25 is preferably such as to cause the reflected shafts to be directed through the end apertures substantially radially with reference to the center about which the film is curved. With this arrangement the light is directed through the several pictures of the series at right angles to the film. In practice I may employ fused quartz for the plates 25 so that the plates will effectively withstand heat.

The means 14 provided for receiving the light projected through the pictures and to direct it onto a screen includes, generally, reflectors 30 in the paths of the shafts of light projected through the end apertures of the plate 17, lens devices 31 receiving the light from the reflectors 30, and a lens device 32 receiving the light projected through the center aperture B. The reflectors 30 are angularly disposed in the shafts of light passed by the end apertures so that the reflected shafts are directed somewhat inwardly or toward the center shaft passed by the center aperture B so that the three shafts fall into register on a screen. The lens devices 31 and 32 are preferably all alike and are equally spaced from their respective apertures or pictures. The spacing of the lens devices with reference to the several pictures is clearly illustrated in the diagram Fig. 1. In practice to obtain an image in color on a screen suitable color filters 35 may be interposed in the shafts of light divided by the means 13. In the arrangement illustrated in the drawings the filters 35 are located between the screen and the lens devices 31 and 32.

In practice suitable mountings are provided for the parts requiring adjustment. For instance, the reflectors 30 may be mounted so that they can be suitably adjusted, in fact, the reflectors 30 and lens devices 31 may be supported by frames or carriers which are adjustably mounted in the case 36 of the apparatus, while the reflectors 30 and lens devices 32 may be independently adjustable relative to the carriers. It is to be understood that the present invention is not concerned with mechanical details for effecting proper adjustment of the parts, and therefore I have not set forth these features in detail. In the form of the invention illustrated the reflectors 30 are in the nature of prisms having back faces 40 silvered or otherwise made reflective and having front faces 41 and 42 which are clear and at right angles to the shafts which enter and leave prisms.

With the optical system described, the center or middle picture of each series is revised or turned over relative to the end pictures in the course of projection. The pictures on the film are correspondingly related so that all of the pictures are in register on the screen. It is to be particularly noted that the optical system requires only a single reflector in the path of light from each end picture and that no reflector whatever is required for the center picture.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. In an optical system of the character described, a film carrier having a curved part supporting a film about a center, means throwing a single shaft of light, light dividing means located between said first-mentioned means and the film carrier receiving said shaft of light and dividing it into a plurality of shafts and directing them radially relative to said center and through spaced pictures on the film supported by the carrier, and means receiving the shafts after they have passed through the film and directing them onto a screen in register.

2. In an optical system of the character described, a film carrier having a curved part supporting a film about a center, means throwing a single shaft of light, two regularly related transparent plates between the said means and the film carrier receiving the shaft of light and dividing it into a plurality of shafts and directing them radially relative to said center and through spaced pictures on the film supported by the carrier, and means receiving the shafts after they have passed through the film and directing them onto a screen in register, the shaft of light being directed by said means so that the light passed by the plates passes through the film and onto the screen.

3. In an optical system of the character described, a film carrier having a curved part supporting a film about a center, means throwing a single shaft of light, light dividing means within the curved part of the film carrier receiving the shaft of light and dividing it into a plurality of shafts and directing them radially outward relative to said center and through spaced pictures on the film carried by the carrier and means receiving the shafts after they have passed through the film and directing them onto a screen in register with the shaft of light passed by the light dividing means through the film and onto the screen.

4. In an optical system of the character described, a film carrier having a curved part supporting a film about a center and having a plurality of circumferentially spaced apertures, means directing a single shaft of light into the film supporting part, light dividing means receiving the shaft of light and dividing it into a plurality of shafts and directing them radially relative to said center and through the apertures and pictures on the film radially relative to said center, and means receiving the shafts after they have passed through the film and directing them onto a screen in register.

5. In an optical system of the character described, a film carrier having a film supporting part curved about a center, means directing a single shaft of light into the concave portion of the film supporting part, two transparent plates arranged in the shaft of light, the plates being angularly related and joined on a line intersecting the shaft of light so that they divide said shaft of light into a plurality of spaced shafts extending radially relative to said center and through the film carried by said part, and means receiving the shafts after they have passed through the film and directing them onto a screen in register.

6. In an optical system of the character described, a film carried having a curved part supporting a curved film about a center and having a plurality of circumferentially spaced apertures, means directing a single shaft of light toward the film guiding part, two transparent plates arranged in the shaft of light, the plates being angularly related and joined on a line intersecting the shaft of light so that they divide part of the light of said shaft of light into a plurality of spaced shafts extending radially relative to said center and through the apertures and the film, and means receiving the shafts after they have passed through the film and directing them onto a screen in register, the first-mentioned shaft of light being directed so that the light passed by the plates passes through an aperture and the film to fall upon the screen.

7. In an optical system of the character described, a film carrier having a curved part supporting a film about a center, a source of light directing a single shaft of light toward the carrier, light dividing means receiving the shaft of light and dividing it into a plurality of shafts and directing them radially to said center and through spaced pictures on the film, and means receiving the shafts after they have passed through the film and directing them onto a screen in register, said last-mentioned means including reflectors receiving the light reflected by the light dividing means and a lens device in the path of each shaft of light.

8. In an optical system of the character described, a curved film guide supporting a film curved about a center, means throwing a single shaft of light toward the guide, light dividing means receiving the single shaft of light and dividing it into three shafts to extend substantially radially through three spaced pictures on the film at the guide, and means receiving the shafts after they have passed through the film and directing them onto a screen in register including a single reflector in the path of light passing through each end picture and a lens in each shaft of light.

9. In an optical system of the character described, a film carrier having a curved part supporting a film about a center, means throwing a single shaft of light, light dividing means within the curved part of the carrier receiving the shaft of light and dividing it into a plurality of shafts and directing them radially outward relative to said center and through spaced pictures on the film carried by the carrier, means receiving the shafts after they have passed through the film and directing them onto a screen in register with the shaft of light passed by the light dividing means through the film and onto the screen, and individual projecting lenses passing the shafts of light after the shafts have passed the film.

10. In an optical system of the character described, a film carrier having a curved part supporting a film about a center and having a plurality of circumferentially spaced apertures, means directing a single shaft of light into the film supporting part, light dividing means receiving the shaft of light and dividing it into a plurality of shafts and directing them radially relative to said center and through the apertures and pictures on the film, and means receiving the shafts after they have passed through the film and directing them onto a screen in register, adjoining apertures being spaced apart a distance corresponding to the longitudinal extent of a picture on the film.

In witness that I claim the foregoing I have hereunto subscribed my name this 27th day of February, 1930.

WALTER L. WRIGHT.